United States Patent [19]
Lamberty et al.

[11] Patent Number: 5,164,709
[45] Date of Patent: Nov. 17, 1992

[54] SEAT OCCUPANCY SWITCHING DEVICE FOR MOTOR VEHICLES

[75] Inventors: Hans Lamberty; Walter Weishaupt, both of München, Fed. Rep. of Germany

[73] Assignee: Bayerische Motoren Werke AG, Fed. Rep. of Germany

[21] Appl. No.: 761,051

[22] Filed: Sep. 18, 1991

[30] Foreign Application Priority Data

Sep. 19, 1990 [DE] Fed. Rep. of Germany ....... 4029683

[51] Int. Cl.$^5$ ............................................. G08B 21/00
[52] U.S. Cl. .................................. 340/667; 180/273; 307/10.1; 340/457.1
[58] Field of Search ............................ 340/667, 457.1; 307/10.1; 180/273; 310/800

[56] References Cited

U.S. PATENT DOCUMENTS

| 3,750,127 | 7/1973 | Ayers et al. | 310/800 |
| 3,766,344 | 10/1973 | Nevett | 340/667 |
| 4,876,420 | 10/1989 | Lodini | 340/667 |

Primary Examiner—Glen R. Swann, III
Attorney, Agent, or Firm—Evenson, Wands, Edwards, Lenahan & McKeown

[57] ABSTRACT

A seat occupancy switching device for motor vehicles having a sensor responding to seat occupancy and an analysis circuit which emits a signal when a seat is occupied. The sensor is a lateral-force-sensitive cable which is arranged in the area of the seat surface. This cable provides a plurality of signal changes occurring continuously during seat occupancy. The analysis circuit registers each change of the sensor output signal as seat occupancy information. This analysis circuit includes a processor that receives the sensor output signal, and a monostable-circuit step.

7 Claims, 1 Drawing Sheet

SEAT OCCUPANCY SWITCHING DEVICE FOR MOTOR VEHICLES

BACKGROUND OF THE SUMMARY OF THE INVENTION

The present invention relates to a seat occupancy switching device for motor vehicles having a sensor responsive to seat occupancy and a corresponding analysis circuit which, when a seat is occupied, emits a signal.

Multiple types of such switching devices are known. All devices have the following operating method in common: In these cases, a corresponding one-time signal is generated when the seat is occupied and a corresponding different one-time signal is generated when the seat is vacated. Because the loads applied to the seat may differ as a result of the different body weight of the vehicle users and of the different positioning on the vehicle seat, the demands on the known switching devices are particularly high, both from a mechanical as well as from an electrical or circuit-technological point of view. It must be ensured under all circumstances that an actual occupying of the seat is really recorded.

An additional problem in the case of vehicle seats is the fact that, after some time, they exhibit aging phenomena. Because of the decreasing elasticity of the vehicle seats, the seat surface drops after some time. As a result, the provided switching path of a, for example, mechanic which is arranged under the seat surface in the seat is also reduced. Although it is known in this con (German Patent Document 3711677 C) to eliminate this phenomenon by an automatic readjusting device, this requires considerable additional mechanical expenditures.

It is an object of the invention to provide a seat occupancy switching device of the initially mentioned type which, with low expenditures and under all stress conditions, permits a secure and reliable recognition of a seat occupancy also for a long operating time.

This and other objects are achieved by the present invention which provides a seat occupancy switching device for motor vehicles, comprising a sensor and an analysis circuit. The sensor responds to seat occupancy, so that when a seat is occupied, it emits a sensor output signal, and is a lateral-force-sensitive cable arranged in the area of a seat surface. The analysis circuit is coupled to the sensor and registers each change of the sensor output signal as seat occupancy information.

By using the lateral-force-sensitive cable, it becomes possible to detect a seat occupancy at different points of the seat surface. The analysis of the changes of the sensor output signal furnishes a large amount of seat occupancy information signals during the period that the seat is occupied, which are reception, it is possible without any problems to process the loss of an individual switching signal, which loss could have a disastrous effect in the case of a pure "black-and-white" analysis. The seat occupancy is therefore not recognized by a one-time signal but by a number of signals which are detected also during the seat occupancy. They are triggered during every significant movement of the vehicle user. This movement may take place intentionally or may be caused by relative movements of the vehicle user because of accelerations of the motor vehicle. Depending on the sensitivity of the sensor, microscopic shifts of the vehicle user on the seat surface can therefore already be detected.

The analysis of the seat occupancy information may, for example, take place for the changes of the sensor output signal which exceed a specific threshold value. This threshold value may be selected to be constant or adaptive, for example, corresponding to the number of changes of the sensor output signal occurring per time unit. It will then be ensured that, within the respective measuring period, in the case of a seat occupancy, a given amount of seat occupancy data is available while, when there is no occupancy, the amount of this information is equal to zero or less than the given value. By means of this differentiation, it becomes possible to recognize an actual seat occupancy reliably and effectively and to correspondingly control switching devices, which follow, such as a triggering circuit for an airbag, a pre-load device or even a seat heating device.

Further embodiments of the present invention related to the arrangement and the construction of the cable provide other advantages. For example, an embodiment of the present invention in which the cable is arranged at the points of the seat surface which are subjected to the highest stress provides the advantage of increased recognition reliability. Foaming the cable into the seat body, as provided in certain embodiments of the invention, provides an advantageous constructive design. An elegant electric construction is provided by the cable containing a piezoelectric active material.

Other objects, advantages and novel features of the present invention will become apparent from the following detailed description of the invention when considered in conjunction with the accompanying drawings.

DETAILED DESCRIPTION OF THE DRAWINGS

Figure 1:
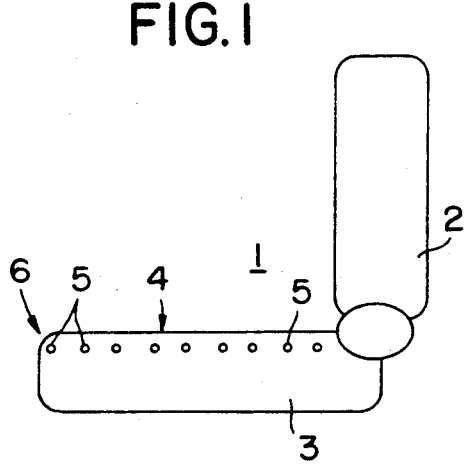
FIG. 1 schematic lateral view of a seat occupancy switching d according to an embodiment of the present invention for a motor vehicle seat.
Figure 2:
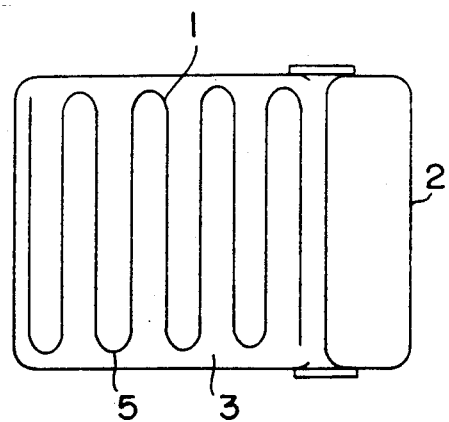
FIG. 2 is a top view of the device of FIG. 1.

The seat of a motor vehicle which is schematically illustrated in FIGS. 1 and 2 essentially comprises a top part 2 and a bottom part 3. A lateral-force-sensitive cable 5 is laid in a meandering shape in the bottom part 3 in the area of the seat surface 4. For this purpose, the cable 5 is foamed into the seat body which is not shown and which, with respect to the seat frame (which is also not shown), is supported by elastic elements, such as springs. Also not shown are different embodiments for geometry of the cable 5, which can be changed with respect to the shown arrangement. The cable 5 can be, for example, in the area of the seat that is subjected to a higher stress in the proximity of the top part, laid in a closer manner than in the area of the seat front edge 6.

Figure 3:
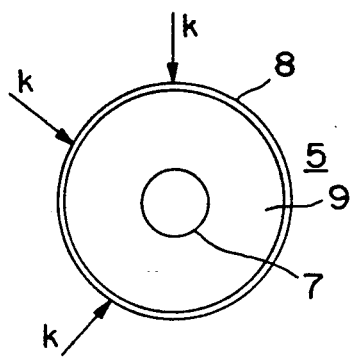
FIG. 3 is a cross-sectional view of the sensor used in the switching device of the present invention.
Figure 4:
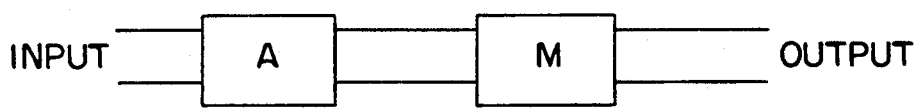
FIG. 4 is a view of the circuit-technological processing of the supplied sensor signal.

A cross-sectional view of the cable 5 is shown in FIG. 3. It includes an electric inner conductor 7, an electric outer conductor 8, and a piezopolymer 9 between conductors 7 and 8. A cable of this type is sensitive to lateral forces and when being acted upon by a variable lateral force K, furnishes a variable output signal at its output. This output is situated at the start or end of the cable 5 and is not shown in detail. The output signal is fed to an analyzing switching device which is schematically illustrated in FIG. 4.

The switching device comprises a conventional processor A in which the sensor signal is amplified and is sent through a threshold switch. Subsequently, it is fed to the input of a triggered monostable-circuit step M. The aftertriggering time $t_1$ is assumed to be, for example, 2 minutes.

Figure 5:
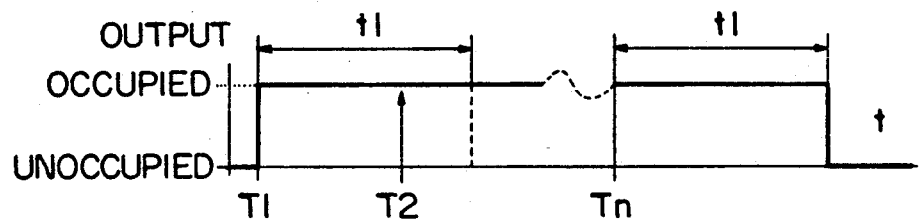
FIG. 5 is a time diagram explaining the method of operation of the device.

When a seat starts to be occupied (T1, FIG. 5), the bending of the seat surface 4 results in a changed output signal of the sensor cable 4 which triggers the monostable circuit M. The monostable circuit M therefore furnishes a changed output signal on its output for the triggered time $t_1$. This output signal is analyzed as a report of an occupied seat. By the intentional or unintentional movements of the seated person, additional triggering signals are triggered, which are schematically shown in the diagram of FIG. 5 by means of their respective event points T2 and $T_n$. As a result, the monostable circuit M is, in each case, triggered as long as the seat is occupied. The output signal therefore remains on the value which it had when the seat started to be occupied (point in time $T_1$).

When the seat is vacated, the sensor cable 5 furnishes a constant output signal, for example, a 0-value. The monostable circuit M is then no longer triggered and, after the time $t_1$, starting from the last triggering, furnishes the same output signal which it had before the first triggering. The vacating of the seat is recognized precisely after 2 minutes, when an triggered time of 2 minutes is assumed. In this case, the triggered time $t_1$ is selected such that, when a seat is occupied within this time, a change always occurs in the output signal for the sensor cable 5. The causes in this case are, as indicated above, intentional and unintentional movements of the seated person on the seat surface which always exist within this time period. It can easily be recognized that aging influences in the form of, for example, a diminishing elasticity of the seat body or of the seat springs, remain without effect on the information of a seat occupancy just as the possible loss of an individual triggering signal for the monostable circuit M. In this case, the sensitivity of the whole switching device can be selected by the determination of the threshold in the processor A and by the adjustment of the triggered time $t_1$.

Although the invention has been described and illustrated n detail, it is to be clearly understood that the same is by way of illustration and example, and is not to be taken by way of limitation. The spirit and scope of the present invention are to be limited only by the terms of the appended claims.

What is claimed:

1. A seat occupancy switching device for motor vehicles, comprising:
    a sensor responding to seat occupancy, which, when a seat is occupied, emits a sensor output signal having a plurality of signal changes occurring continuously during seat occupancy, said sensor being a later-force-sensitive cable arranged in the area of a seat surface; and
    an analysis circuit coupled to the sensor, the analysis circuit registering each change of the sensor output signal as seat occupancy information.

2. A switching device according to claim 1, wherein the cable is arranged at points of a seat surface which are subjected to the highest stress.

3. A switching device according to claim 2, wherein the cable is foamed into a seat body.

4. A switching device according to claim 3, wherein the cable contains a piezoelectric active material.

5. A switching device according to claim 2, wherein the cable contains a piezoelectric active material.

6. A switching device according to claim 1, wherein the cable contains a piezoelectric active material.

7. A switching device according to claim 1, wherein the cable is foamed into a seat body.

* * * * *